United States Patent [19]
Diersch et al.

[11] Patent Number: 6,101,606
[45] Date of Patent: *Aug. 8, 2000

[54] SYSTEM FOR SECURING PROTECTED SOFTWARE FROM UNAUTHORIZED USE IN COMPUTER NETWORKS

[75] Inventors: Hans-Joerg Diersch; Rainer Gruendler, both of Berlin; Kaden Stefan, Wildau; Ingo Michels, Berlin, all of Germany

[73] Assignee: Wasy GmbH, Berlin, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,459

[22] Filed: Mar. 21, 1997

[30] Foreign Application Priority Data

Mar. 22, 1996 [DE] Germany ............... 196 12 999

[51] Int. Cl.⁷ .................. G06F 11/30; H04L 9/00; H04K 1/00
[52] U.S. Cl. .................. 713/201; 713/202; 380/4; 380/23
[58] Field of Search .................. 395/186, 188.01, 395/187.01, 200.54, 200.53; 380/3, 4, 23, 25; 713/200, 201, 202

[56] References Cited

U.S. PATENT DOCUMENTS

| | | | |
|---|---|---|---|
| 4,924,378 | 5/1990 | Hershey et al. | 395/187.01 |
| 4,937,863 | 6/1990 | Robert et al. | 380/4 |
| 5,138,712 | 8/1992 | Corbin | 395/700 |
| 5,390,297 | 2/1995 | Barber et al. | 395/200 |
| 5,455,953 | 10/1995 | Russell | 395/739 |
| 5,553,143 | 9/1996 | Ross et al. | 380/25 |
| 5,568,552 | 10/1996 | Davis | 380/4 |
| 5,577,209 | 11/1996 | Boyle et al. | 395/200.06 |
| 5,638,513 | 6/1997 | Ananda | 395/188.01 |
| 5,671,412 | 9/1997 | Christiano | 395/615 |
| 5,684,951 | 11/1997 | Goldman et al. | 395/188.01 |
| 5,708,709 | 1/1998 | Rose | 380/4 |
| 5,720,036 | 2/1998 | Garfinkle et al. | 395/187.01 |
| 5,742,757 | 4/1998 | Hamadani et al. | 395/186 |
| 5,745,879 | 4/1998 | Wyman | 705/1 |
| 5,805,802 | 9/1998 | Marx | 395/188.01 |

FOREIGN PATENT DOCUMENTS

| | | | |
|---|---|---|---|
| 0183608 | 6/1986 | European Pat. Off. | G06F 1/00 |
| 40 10 094 | 10/1991 | Germany | G06F 12/14 |
| 94 20 092 | 3/1995 | Germany | G06F 12/14 |
| 9115816 | 10/1991 | WIPO | G06F 1/00 |
| 94066071 | 3/1994 | WIPO | G06F 1/00 |

OTHER PUBLICATIONS

Patent Abstracts of Japan, Unexamined Applications; vol. 18, No. 606 (P–1827)(6946); Nov. 17, 1994.

*Primary Examiner*—Norman Michael Wright
*Attorney, Agent, or Firm*—Baker Botts L.L.P.

[57] ABSTRACT

The invention relates to a system for securing protected software against unauthorized, i.e. non-licensed, use in computer networks. The difficulty in licensing of software in a network is that simultaneous and multi-use of the licensed software on several or all computers integrated in the network have to be realized. Without software protection the software producer will lose potential customers. This concerns local networks as well as so-called wide area networks which can be operated across national or continental boundaries. In accordance with the invention the object is accomplished by a system for securing protected software against unauthorized use in computer networks consisting of a query component, a management component and an authorization component whereby the query component communicates with the management component in a bidirectional exchange of information and the management component communicates with the authorization component in a bidirectional exchange of information, wherein the authorization component is a module or licence box having a unique identification code and is separate, independent of any computer in the network and integrable into the computer network in any way.

15 Claims, 3 Drawing Sheets

SYSTEM FOR SECURING PROTECTED SOFTWARE FROM UNAUTHORIZED USE IN COMPUTER NETWORKS

BACKGROUND OF THE INVENTION

1. Field of the Invention

The invention relates to a system for securing protected software from unauthorized, i.e. unlicensed, use in computer networks, e.g. networks of UNIX workstations.

With increasingly widespread use of computer networks, there is a growing need to protect software producers from unauthorized use, within computer networks, of the software programs which they produce. In recent times, increasing importance has been attached to computer networks consisting of several interconnected work stations each having its own processor capacities, one or several processors, and which allow simultaneous operation of the same software at several work locations. This implies the possibility that a computer program, which is working on at least one computer integrated into a network, can be used simultaneously on several computers, on several processors and in multi-tasking operation on one processor, because without the possibility of simultaneous multi-use, all customers would have to purchase several copies of the program.

The problem of licensing software on a network consists therefore in allowing usage and protection for licensed software in a simultaneous multi-user environment on several, or all, computers integrated into the network. Without software protection, multi-use will lead to the software producer losing potential customers. This is the case for local networks as well as for so-called wide area networks which can be operated across national or continental boundaries.

At the same time, it is also very useful for the customer if the number of software licenses to be bought is dependent upon actual user requirements for the software and not on the number of computers provided for that use.

It is therefore in the interests of the software producer and also of the customer to provide for effective protection of licensed software in a network but which at the same time does not hinder users in the authorized, flexible use of the software purchased.

2. Description of the Prior Art

Systems used until now for protecting software are based on two fundamental principles. These are, on the one hand, PC orientated hardlocks, also known as dongles, which are normally connected to the computer's parallel interface. A dongle normally uses a hardware key to authorise the use of a program on a computer to which the dongle is physically connected.

Examples of a dongle are to be found in WO 91/15816, WO 94/06071 and EP 183 608.

The disadvantages of such a system are that the dongle must be connected to the computer upon which the software is to be used. If a licence is to be used on another computer, it is necessary to transfer the dongle. When using several software programs, each of which is protected by a dongle, the number of dongles becomes a hinderance because the necessary arranging of the different dongles, one after the other, becomes a technical impediment whilst at the same time decreasing operational security, which can lead to computer crashes and hardware damage. Such a dongle is not suitable for use in computer networks since neither the number of simultaneously operating software programs can be monitored, nor the licensing of software programs on other computers is possible. Multi-user licenses and licenses on different platforms, such as personal computers and UNIX workstations cannot be managed.

At the same time it is a guarantee deficiency associated therewith that upon logging onto a PC in a network via an external terminal, e.g via WINDD from Tektronix Co., uncontrolled multi-use of protected software is possible.

The second possibility for software protection comprises the use of a so-called licence manager in computer networks which represents a program installed on one computer in a network. This program monitors the use of a given number of licenses for protected programs running either on the same computer or on a different computer of the same network. Authorisation for usage of the program is based on definite identification of each computer by means of its so-called host-ID or its network address.

Examples of licence managers such as these are the Flexlm from Highland Software and Netls from Hewlett Packard and is also disclosed in the Japanese patent application 6-223040.

The disadvantages of a so-called licence manager, which is installed on one computer in a network, are that the monitoring of the licenced programs is tied to one or several specific computers in a network, the licencing being dependent, therefore, on at least one specific computer. If this computer ceases to function, either through defect or by its removal from the network, e.g because of aging or necessary repairs, this results in no further work being possible with the licensed software programs on all other computers in the network. It is also impossible to transfer existing licenses from one network to another. In this case it is necessary to contractually agree to a costly re-licensing. Furthermore, this transferring of the licence does not prevent the licensee from illegally continuing to use the previous licence on the old computer.

SUMMARY OF THE INVENTION

Therefore it is the object of the invention to develop software protection for use in computer networks, consisting of at least one computer, which corresponds to the requirements and interests of the licenser and which, at the same time, does not prevent the authorized use of the software purchased. The software protection should be independent of a specific computer in a network and be applicable on any computer networks.

In accordance with the invention the object is accomplished by a system for securing protected software against unauthorized use in computer networks consisting of a query component, a management component and an authorization component whereby the query component communicates with the management component in a bidirectional exchange of information and the management component communicates with the authorization component in a bidirectional exchange of information, characterised in that the authorization component is a module having a unique identification code and is separate, independent of any computer in the network and integrable into the computer network in any way.

This module licence box, with its own identification code and integrated into the network independent of any network computer, gives a level of software protection which allows the allocation and monitoring of network-wide floating licenses independent of any hardware platform and independent of specific computers which may be subject to aging and defects and thus its removal. In this specification the term "module" is meant in the sense of a "licence box"

which is an independent hardware unit and which is not integrated in or part of a computer. The advantage of this is that all computers in the network can be interchanged as required whilst making possible the continued licensed usage of software in the licensed numbers on any desired computer in the network. The licenses are thus readily transferable to any other computer network as required, simply by removing the module from one computer network and integrating it into another network. Further simultaneous use of the software in the old network is not possible. It is thus no longer necessary to remove the computer from the previous network and integrate it into the new network. If a specific computer is removed from the network or is defective, the licensed software can still be used without restriction on other computers in the network. It is thus unnecessary to carry out a re-licensing, which is costly and offers only a limited or poor software protection as it was previously necessary with the computer which had been programmed by the licence manager and equipped with the identification code.

The module or licence box represents an independent host in the network and provides a unique identification code across the network. The identification code can be either a host ID, its network address or another unique password.

By using this identification code and licence information, the licenser designs a unique licensing code for the software to be protected. Modifications of the licenses can only be made by the licenser by modifying the licensing code.

The user requires the identification code, licence information and the licensing code for authorization of the use of the protected software.

This licence information should include the licenser(s), the name and version of the license(s), the number of licenses as well as the begin and end dates of the licensing period. Further or other licence information can be stored for call up as required.

In a preferred embodiment the module is provided with all information necessary to authorise the usage of the licensed software, this information being made up of the identification code, the licensing code and the licensing information.

In another preferred embodiment, the authorization component consists of the module and a file which can be loaded or installed on any computer in the network as required, or which can be stored in readable form by the computer in any other manner. The file contains either the licensing code or the licence information, or both, i.e. licensing code and licence information with the module including, in each case the information which is still missing, but in every case includes the identification code.

By storing of a new licensing code and new licence information completely new licenses for other software of the same licenser or another licenser as well as modifications to existing licenses can be input.

Storing the information necessary for authorization in the authorization component has the advantage that several different licenses which may originate also from different licensers can be stored simultaneously and can be permitted upon demand for authorized use. It is of no significance on which computer in the network the licensed software is to be used. The use is only restricted by the number of users allowed by a license. That means for example, if ten licenses have been granted for a particular software program for the network, these ten licenses are permitted for simultaneous use, as required, independent of computer, whilst any requests above this number will be rejected. This is the responsibility of the management component.

The management component includes software for managing the protected software, which can be either loaded or installed on any computer in the network, as required, or is integrated into the module.

The individual components of the software protection system exchange information with each other in a bidirectional manner, i.e. the query component communicates with the management component and this, in turn, communicates with the authorization component. This information exchange is carried out, preferrably, with the aid of coded protocols. Storing of the information in the module, preferably a programmable electronic unit such as a CMOS-storage device, is also carried out with the aid of a coded protocol.

Each module is provided with a unique code, i.e. no other module has the identical code. The management component is able, with the aid of installed or loaded licence management software to identify and process this identification code. If a licensed software is called on any network computer which is provided with the system according to the invention, its query component will establish a connection with the nearest management component. The management component then establishes a connection to the authorization component to obtain the necessary information, i.e. the identification code, the licence information and the licensing code for permitting or blocking the usage of the software. If the necessary information is made available by the module, i.e. if the management component identifies, for example, the module's host ID, and if the licence information corresponds with the licensing code, the use of the software will be permitted for the requesting computer. If there is no correspondence between the information and the information in the management component, i.e authorized use of the software is not identified, the use of the software will not be permitted.

The computer network can be a local network as well as a wide area network. The module can be removably integrated at any place into the computer network with the aid of the corresponding conventional network connections. These network connections are, for example, network cables with suitable pin/plug connections. The module, which also can be referred to as a licence box is a separate hardware component, preferably an electronic component which is independent of the computers in the network.

BRIEF DESCRIPTION OF THE DRAWINGS

The invention will now be described by way of examples of embodiments taken in conjunction with the accompanying drawings.

DESCRIPTION OF THE EMBODIMENTS

Figure 1:
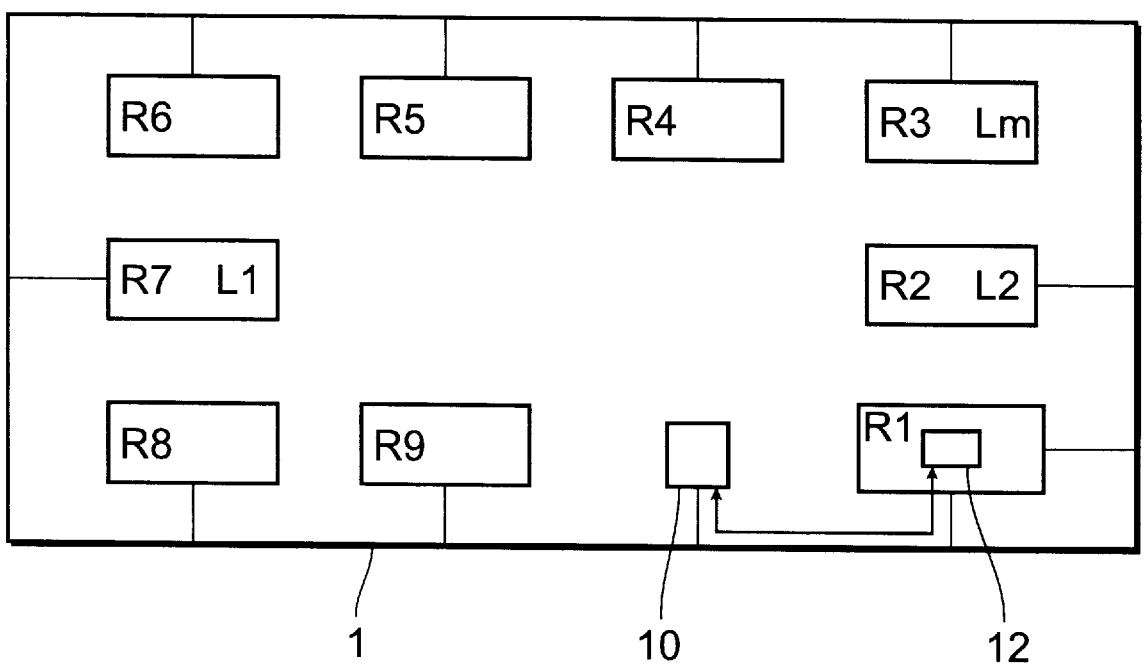
FIG. 1 shows a diagrammatic representation of a computer network with integrated module.

FIG. 1 shows a diagrammatic representation of a computer network consisting of nine computers R1 to R9 in total. One network computer, in this case R1, has licence management software 12 installed or loaded, which exchanges information with computers R1 to R9 as well as with a module 10 integrated in the computer network 1. Software 12 could be loaded or installed in any of the network computers R1 to R9, or could be integrated into module 10 itself, and the use of licensed software Lm (m is a whole number and represents the number of licenses of a protected software program in a network). Software 12 is supplied to the licensee with the licence of the licensed software Lm. The licence can be configured different for different types of licenses, e.g. floating licence or a license tied to a host. The licensed software Lm includes a query component which addresses the software 12 and the software 12 establishes the further connection to the module 10 which is separate from the computers R1, . . . ,Rn.

Query and permitting the authorized use of the licensed software takes place in different courses depending on the configuration of module 10.

Figure 2:
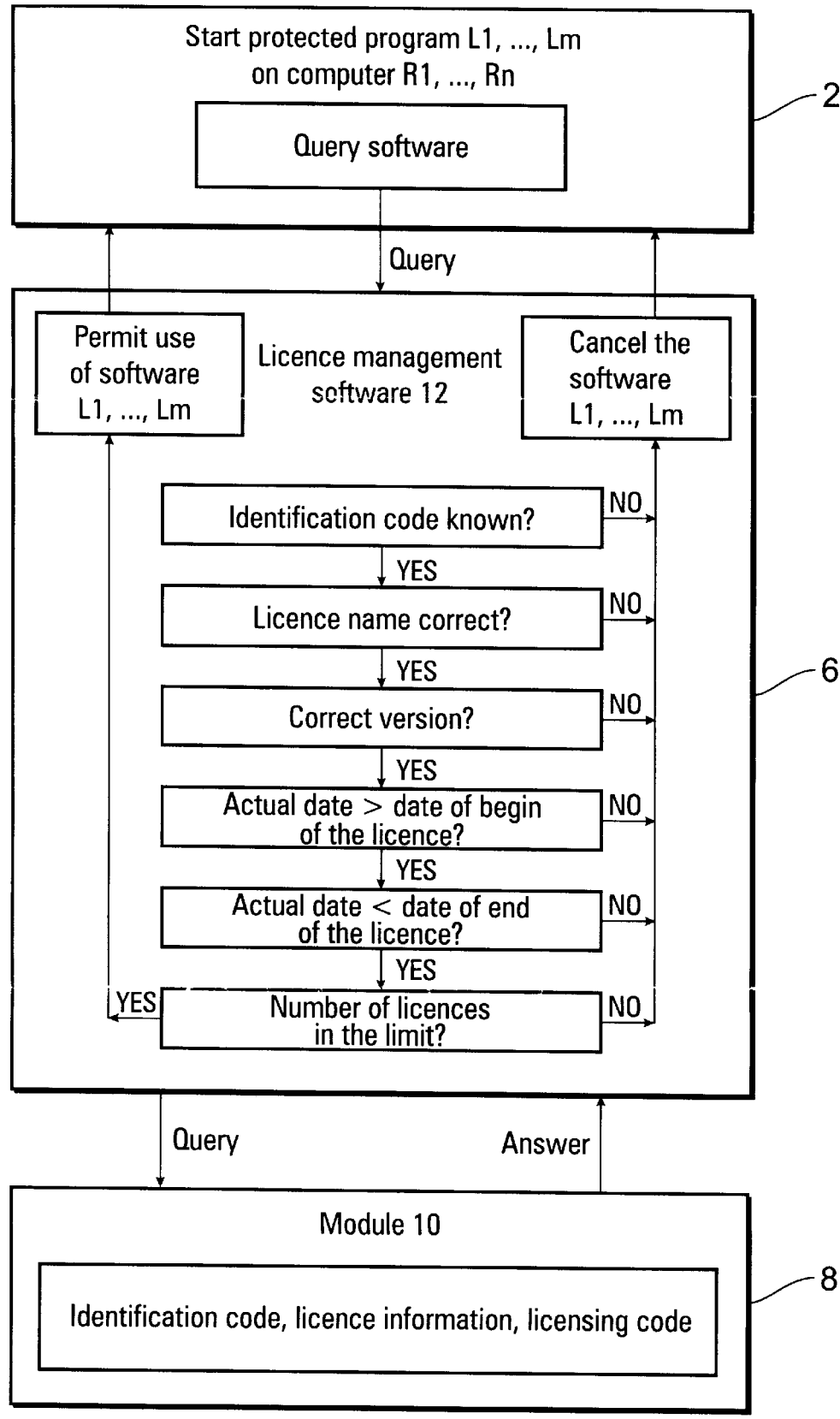
FIG. 2 shows a flow diagram of the authorization process and permit.

FIG. 2 shows a flow diagram where the authorization component 8 consists only of module 10 and is provided with all the information necessary for the authorization of program usage.

If a protected program L1, . . . ,Lm is started on one or several computers R1, . . . ,Rn, a connection will be established by the query component 2 of the program L1, . . . ,Lm to the management component 6, which in this case includes software 12 loaded in one of the network computers R1, . . . ,Rn. This Software could also be integrated into module 10 itself. This software 12 then attempts to establish a connection to the authorization component 8 integrated into the computer network, in this example module 10. If such a module is not available or cannot be addressed because the corresponding information is missing, the program 12 blocks further run of the protected program L1, . . . ,Lm. If an appropriate module 10 is found in the network, program 12 causes a query to the module 10 for the identification code, the licence information and the licensing code and determines whether usage of the protected program L1, . . . ,Lm is authorized or not. The query can be carried out either sequentially or simultaneously and includes the following stages:

Is the identification code known?

Is the licence name available or known?

Is it the right program version?

Is the date of query within the begin and end dates of the license?

Has the number of licenses been exceeded?

Only when all the questions have been answered with "Yes", the use of the protected software L1, . . . ,Lm will be permitted on the corresponding network computer R1, . . . ,Rn. If any one of the questions is answered with "No", no further use of the program will be allowed and the program will be cancelled or further access will be blocked.

The exchange of information between components 2, 6 and 6, 8 is realized by means of a coded protocol.

Figure 3:
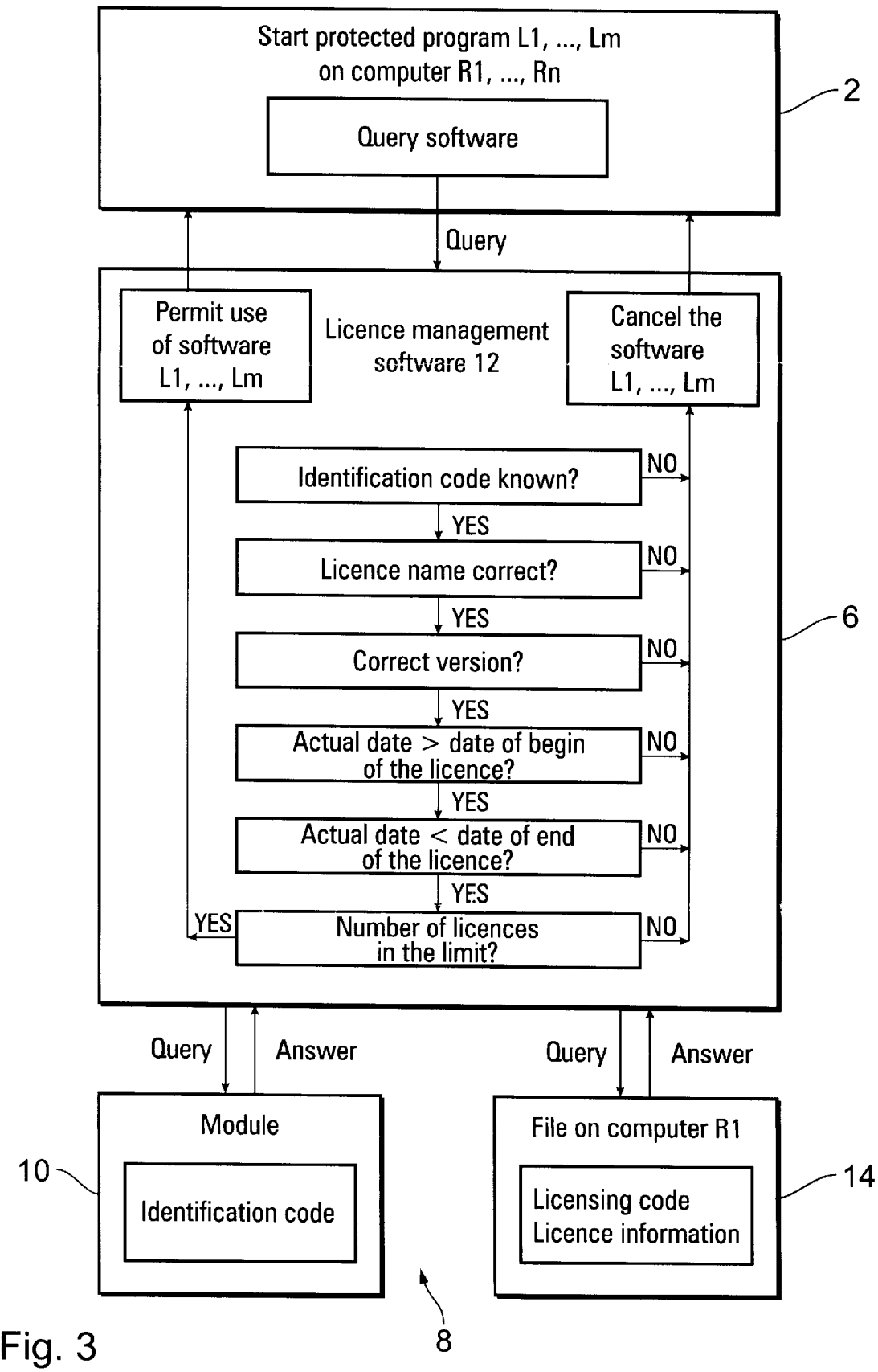
FIG. 3 shows a flow diagram of the authorization process and permit in accordance with a further embodiment of the invention.

In another embodiment of the invention, shown in the flow diagram in FIG. 3, the authorization component 8 consists of the module 10 as well as a file 14 which is loaded or installed on one of the network computers R1, . . . ,Rn or is in some other way readable. Only the identification code is stored in module 10, while the other licence-related information is contained in the file 14 in the network computer R1, . . . ,Rn, on which the licence management software 12 is also, preferably, installed or loaded, so that query of module 10 only checks the correspondence or matching of the host ID or the network address, respectively, with the license. The remaining information is read out from the file 14 and checked by the license management software 12.

Even here, however, further alternatives are possible. Software 12 could be a component of module 10, or the licensing code or the licence information could be stored in module 10 instead of in file 14.

Whilst each module is already provided with a unique identification code which is different from that of every other module, the other licence-related information can be modified at any time in the licensing code as desired. This is established by the licenser or his authorized vendor providing a new licensing code. Thus the number of licenses, the licence name, and the version of the licence can be updated as required in accordance with the contractual arrangement between the licenser and the licensee and new licenses can also be integrated, as required, for other protected programs. A new updating will also be carried out upon delivery of a new version of the licence software. Unauthorized further use of old versions of the licence is thus no longer possible. By entering the dates of the beginning and end of the licensing period, a simultaneous check can be made that the contractually agreed licensing period is kept and any unauthorized usage outside this period can be prevented. If the protected programs originate with one licenser, the same software will normally be used for licence management. If protected software is provided by different licensers, different licence management programs 12 may be necessary for the exchange of information with module 10. The licensee will then receive the licence management program 12, corresponding to the protected software or to a new version, which is loaded or installed on a network computer or in the authorization component 8.

The identification code, i.e. the host ID, the network address or another unique code are always tied to the separate module 10 which is independent of any computer, so that authorization for use of protected software is only permitted if the licence management software 12 determines the identification code and the other licence information and the licensing code are correct.

What is claimed is:

1. A system for securing protected software against unauthorized use in a network of computers, comprising:
   a query component, a management component which bidirectionally communicates with said query component, and
   an authorization component which bidirectionally communicates with said management component, said authorization component including a hardware module that has a unique identification code, is not integrated in a computer, and is integrated into the network independent of any network computer.

2. The system according to claim 1, wherein said unique identification code is a unique password.

3. The system according to claim 1, wherein said unique identification code is a host ID.

4. The system according to claim 1, wherein said module has a network address and said unique identification code is said network address.

5. The system according to claim 1, wherein said module contains a data file containing all information necessary for authorization.

6. The system according to claim 5, wherein said information necessary for authorization includes said unique identification code, a licensing code, and license information.

7. The system according to claim 1, wherein said authorization component further includes a file loaded on one of the computers and readable by all of the computers.

8. The system according to claim 7, wherein said file includes data representing a licensing code and licensing information.

9. The system according to claim 7, wherein said file includes only a licensing code.

10. The system according to claim 7, wherein said file includes only licensing information.

11. The system according to claim 1, wherein said management component includes software.

12. The system according to claim 11, wherein said software is installed or loaded on a computer in said network as required.

13. The system according to claim 11, wherein said software is integrated into said module.

14. The system according to claim 1, wherein a coded protocol is used to exchange information.

15. The system according to claim 1, wherein said module is a programmable electronic unit.

* * * * *